US012794524B2

(12) United States Patent
Hochdorf et al.

(10) Patent No.: US 12,794,524 B2

(45) **Date of Patent: *Nov. 10, 2026**

(54) SELECTING ANTENNA PATTERNS ON UNMANNED AERIAL VEHICLES

(71) Applicant: Skydio, Inc., San Mateo, CA (US)

(72) Inventors: Eyal Hochdorf, Palo Alto, CA (US); Umar Hasni, Redwood City, CA (US); Saifan Rafiq, Menlo Park, CA (US); Kshitiz Nautiyal, Santa Clara, CA (US)

(73) Assignee: Skydio, Inc., San Mateo, CA (US)

( * ) Notice: Subject to any disclaimer, the term of this patent is extended or adjusted under 35 U.S.C. 154(b) by 198 days.

This patent is subject to a terminal disclaimer.

(21) Appl. No.: 18/760,788

(22) Filed: Jul. 1, 2024

(65) Prior Publication Data

US 2026/0058703 A1 Feb. 26, 2026

Related U.S. Application Data

(63) Continuation of application No. 17/506,769, filed on Oct. 21, 2021, now Pat. No. 12,028,134.

(60) Provisional application No. 63/216,337, filed on Jun. 29, 2021.

(51) Int. Cl.

| | |
|---|---|
| ***H04B 7/06*** | (2006.01) |
| ***B64C 39/02*** | (2023.01) |
| ***G05D 1/00*** | (2006.01) |
| ***G05D 1/226*** | (2024.01) |
| ***H04B 7/0404*** | (2017.01) |
| *B64U 10/13* | (2023.01) |
| *B64U 30/20* | (2023.01) |

(52) U.S. Cl.

CPC ......... *H04B 7/0602* (2013.01); *B64C 39/024* (2013.01); *G05D 1/0022* (2013.01); *G05D 1/226* (2024.01); *H04B 7/0404* (2013.01); *B64U 10/13* (2023.01); *B64U 30/20* (2023.01); *B64U 2201/20* (2023.01)

(58) Field of Classification Search

CPC .. H04B 7/0602; H04B 7/0404; H04B 7/0608; B64C 39/024; G05D 1/0022; G05D 1/226; G05D 1/0038; B64U 10/13; B64U 30/20; B64U 2201/20; B64U 2101/30; B64U 2201/104

See application file for complete search history.

(56) References Cited

U.S. PATENT DOCUMENTS 10,771,939 B1 * 9/2020 Buchmueller .......... H04W 4/40

2018/0319495 A1 * 11/2018 Tu ........................ G05D 1/0011

* cited by examiner

*Primary Examiner* — Ankur Jain

(57) ABSTRACT

Described herein are unmanned aerial vehicles (UAVs) and systems and methods for dynamically selecting directional antennas onboard the UAV for wireless transmissions. For example, an embodiment pertains to an aerial vehicle (e.g., a UAV) that includes a body, a plurality of rotor assemblies a plurality of rotor arms, each rotor arm having a proximal end structurally coupled to the body and a rotor assembly of the plurality of rotor assemblies structurally coupled to a distal end, a processor configured to at least identify an orientation and position of the aerial vehicle, and a switching apparatus configured to receive an input indicating at least the orientation and position of the aerial vehicle and, responsive to receiving the input, select one or more directional antennas on the aerial vehicle from which to communicate with.

20 Claims, 9 Drawing Sheets

SELECTING ANTENNA PATTERNS ON UNMANNED AERIAL VEHICLES

CROSS-REFERENCE TO RELATED APPLICATION

This application is a divisional of U.S. patent application Ser. No. 17/506,769, titled "SELECTING ANTENNA PATTERNS ON UNMANNED AERIAL VEHICLES," filed Oct. 21, 2021, which is entitled to the benefit and/or right of priority of U.S. Provisional Ser. No. 63/216,337 filed on Jun. 29, 2021, the contents of each of which are hereby incorporated by reference in their entirety for all purposes. This application is therefore entitled to a priority date of Jun. 29, 2021.

TECHNICAL FIELD

Various embodiments of the present technology relate to unmanned aerial vehicles (UAVs) and systems, methods, and devices for dynamically selecting antennas onboard a UAV for wireless communications.

BACKGROUND

Unmanned aerial vehicles (i.e., drones) can be extremely useful for capturing videos, images, and other data from vantage points or access locations that would otherwise be difficult to reach. Accordingly, drones are increasingly being utilized for recreation, military and intelligence gathering, and enterprise uses. The flight, data-gathering and other capabilities of a drone can be controlled by an operator at a remote location, autonomously via control systems onboard the drone, or in some combined manner.

UAVs comprise frames to support onboard equipment, such as avionics, propulsion systems, antennas, batteries, and the like. Propulsion systems can include propellors, motors, engines, or similar flight-capable machinery. Avionics systems serve to navigate the UAV and guide the propulsion systems in flight. For navigation, UAVs typically rely on multiple onboard sensors and communication systems. For example, one or more antennas can be utilized to wirelessly communicate with a remote controller to transmit data such as position and velocity and to receive flight and operational commands. In such instances, antenna strength and range, transmission power, and receiver range dictate a UAV's range of operation. Indeed, a drone's battery is depleted more quickly as more of the drone's battery power is directed to its antennas resulting in a reduced operating time.

Additionally, regulatory restrictions on wireless communication devices can also provide limitations on a UAV's range of operation by capping usable antenna power and/or gain. Regardless, improving efficiency of power consumption drawn by a drone's wireless communication improves its range of operation and the operating time.

OVERVIEW

An unmanned aerial vehicle is disclosed herein that selectively utilizes one or more onboard antennas for wireless communication. The UAV can select an antenna by which to transmit data based on factors comprising the UAV's position and orientation, a remote receiver's position, and a line of sight between the two, among others. Dynamic selection of antennas provides at least one or more benefits such as conserving power, increasing transmission efficiency, and maintaining a maximum antenna gain within regulatory limits.

In an embodiment, a UAV comprises a flight control system and a propulsion system. The propulsion system is operatively coupled with the flight control system and is configured to propel the UAV. The flight control system is configured to communicate with a remote receiver via directional antennas on the UAV. The flight control system is configured to at least determine an orientation and position of the UAV. The flight control system is further configured to select a subset of the directional antennas to transmit a signal to the receiver based on factors comprising the determined orientation and position. The UAV also comprises a transmitter which is directed by the flight control system to transmit the signal using the directional antennas. It may be appreciated that other representations of the disclosed technology herein can include further systems, computing apparatuses, and methods of operating a UAV.

This Overview is provided to introduce a selection of concepts in a simplified form that are further described below in the Detailed Description. This Overview is not intended to identify key features or essential features of the claimed subject matter, nor is it intended to be used as an aid in determining the scope of the claimed subject matter.

While multiple embodiments are disclosed, still other embodiments of the present technology will become apparent to those skilled in the art from the following detailed description, which shows and describes illustrative embodiments of the invention. As will be realized, the technology is capable of modifications in various aspects, all without departing from the scope of the present invention. Accordingly, the drawings and detailed description are to be regarded as illustrative in nature and not restrictive.

BRIEF DESCRIPTION OF THE DRAWINGS

Embodiments of the present technology will be described and explained through the use of the accompanying drawings.

Figure 1:
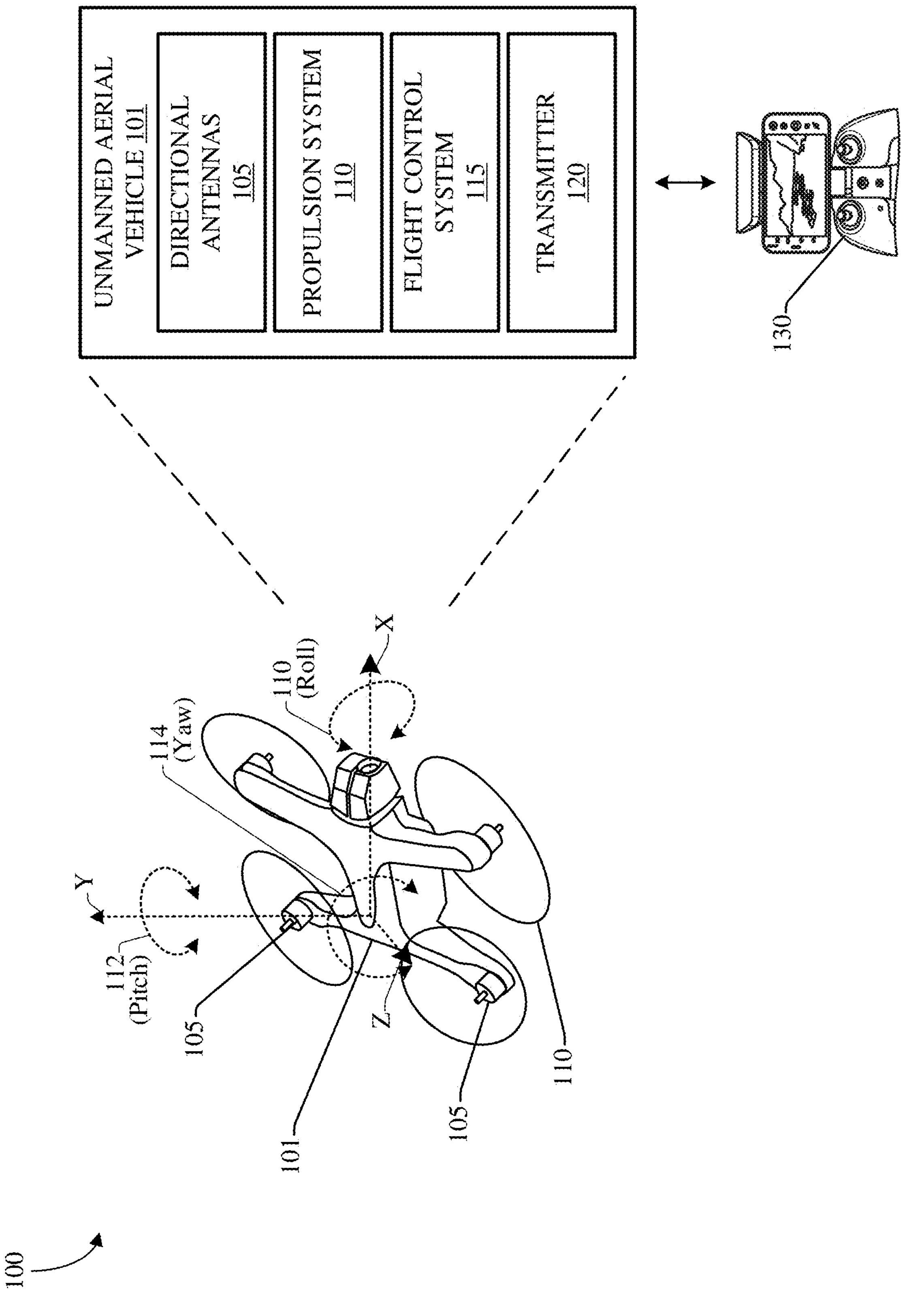
FIG. 1 illustrates an exemplary operating architecture of an unmanned aerial vehicle in which some embodiments of the present technology may be utilized.

The drawings have not necessarily been drawn to scale. Similarly, some components and/or operations may be separated into different blocks or combined into a single block for the purposes of discussion of some of the embodiments of the present technology. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

Various embodiments of the present technology relate to unmanned aerial vehicles and selectively utilizing one or more antenna(s) onboard a UAV for wireless communication between the UAV and a remote receiver. During operation, the UAV communicates transmits to a remote receiver including information like UAV position, velocity, and more, and it receives signals from the remote receiver with information such as movements and controller location, among other things. While performing communication functions, UAVs, like other wireless communication devices, must follow regulatory restrictions that limit antenna gain over certain bandwidths. Some UAVs can utilize more than one antenna for communications; however, by selecting and using a single antenna, the UAV can, among other benefits, conserve power to extend its life, expand its range of operations, and/or maintain antenna gain without surpassing regulatory limitations.

A UAV comprises a body or frame that supports one or more directional antennas. A flight control system onboard the UAV is configured to communicate with a remote receiver using the directional antenna(s). The remote receiver can be a remote controller, a ground/docking station, a satellite, or the like. The UAV also comprises a propulsion system made up of propellors, motors, or the like, to fly the UAV. The flight control system is operatively coupled with the propulsion system to perform flight and navigation functions. In various embodiments, a single directional antenna can be chosen by the flight control system to produce an antenna gain below the threshold limit and thereby maximize antenna characteristics (i.e., effective isotropic radiated power or EIRP) and minimize interference and other issues (i.e., channel fading and signal combining). The flight control system can select the antenna based on factors including but not limited to the orientation and position of the UAV, the direction each antenna faces, and a line of sight between an antenna and the remote receiver. After an antenna is selected, the flight control system can direct a transmitter to adjust power to ensure compliance with regulatory restrictions while range of operations are expanded. It may be appreciated that the flight controller can select a further directional antenna in an iterative method based on changes in the factors. Each time a newly selected antenna is chosen, the UAV can switch from one to another either electromechanically, digitally, mechanically, or some combination thereof.

Another embodiment provides for a computing apparatus that can select an antenna on a UAV for wireless transmission. The computing apparatus comprises one or more computer-readable storage media, and program instructions stored on the one or more computer-readable storage media that, based on being read and executed by a processing system, direct the UAV to perform functions. For example, the program instructions direct the UAV to determine an orientation and position of the UAV. Based on the orientation and position, the UAV can be directed to select a subset of directional antennas, and to transmit a signal to a remote receiver using the selected antennas. In some instances, the program instructions can further direct the UAV to determine which of the directional antennas has a position and direction that comprises a best fit line of sight to the remote receiver. The line of sight can be determined based on the position of the UAV and the position of the controller. The UAV can then determine directivity of each directional antenna to compare with the best fit line of sight.

In yet another embodiment, an aerial vehicle is provided. The aerial vehicle comprises a body, a plurality of rotor assemblies, and a plurality of rotor arms, each rotor arm having a proximal end structurally coupled to the body and a rotor assembly structurally coupled to a distal end. The aerial vehicle further comprises a processor configured to identify an orientation and position of the aerial vehicle. A switching apparatus of the aerial vehicle is configured to receive an input from the processor indicating at least the orientation and position of the aerial vehicle and responsive to receiving the input, the switching apparatus is configured to select one or more directional antennas onboard the aerial vehicle from which to communicate with. The switching apparatus can be further configured to direct a transmitter to communicate with a remote receiver using the one or more directional antennas.

Advantageously, the UAV and selection mechanisms described herein provide improvements to communications systems, devices, and protocols currently employed. For example, a UAV can iteratively run algorithms to determine its position and orientation in real-time allowing for optimal antenna selection for communications. The UAV can thus limit levels of interference in a bandwidth by only selecting one or few directional antennas onboard per a calculated position and orientation. In turn, this reduces power consumption by the UAV as it reroutes power to the selected antenna instead of a larger group of antennas. Further, because the UAV restricts communication operations to specific antennas, the UAV not only increases its range of operations by focusing on a preferred field of view, but also it prevents transmissions from exceeding regulatory boundaries by improving an average EIRP emitted from the selected antennas.

Turning now to the Figures, FIG. 1 illustrates an exemplary operating architecture 100 of an unmanned aerial vehicle (UAV) in which some embodiments of the present technology may be utilized. Operating architecture 100 includes UAV 101 and controller 130. UAV 101 is illustrated with respect to rotation terminology references including roll 110 which indicates a degree of rotation about the X axis, pitch 112, which indicates a degree of rotation about the Y axis, and yaw 114, which indicates a degree of rotation about the Z axis.

As illustrated in operating architecture 100, UAV 101 comprises a body, multiple directional antennas 105, a propulsion system 110, flight control system 115, and a transmitter 120 directed to communicate with controller 130 via the directional antennas 105. In some implementations, controller 130 includes a mobile phone, tablet, or other computer running software configured to communicate with and control UAV 101, or some other remote receiver. In other embodiments, controller 130 can be a stationary ground station or docking station comprising multiple antennas used to communicate with UAV 101. Directional antennas 105 can be located on UAV 101, either internal to the frame, external to the frame, or some combination thereof. Additionally, directional antennas 105 can comprise two groups of separate antennas, each group being located on different parts of UAV 101, and each group consisting of three directional antennas.

In operation, flight control system 115 operates in remote communication with controller 130 via directional antennas 105 located on UAV 101. In a receive mode, flight control system 115 receives one or more signals from controller 130 via a wireless communication link, such as a WiFi network or a Bluetooth link, that issues a movement command of UAV 101 in an airspace. Flight control system 115, operatively coupled with propulsion system 110, can direct propulsion system 110 to maneuver UAV 101 according to controller 130's command. Propulsion system 110 can comprise propellors, motors, a propellor control system, rotor assemblies and rotor arms coupled to the body, or the like. As propulsion system 110 drives UAV 101, UAV 101's orientation and position about the three-dimensional space can change as guided by flight control system 115 via controller 130.

In a transmit mode wherein flight control system 115 sends one or more signals to controller 130, flight control system 115 is configured to select one or more directional antennas of directional antennas 105 to transmit from. Flight control system 115 is configured to determine the position (e.g., longitude and latitude) and orientation (e.g., roll 110, pitch 112, and/or yaw 114 about an axis) of UAV 101. Further, flight control system 115 receives inputs or data about UAV 101's position, orientation, and the like via one or more sensors comprising accelerometer data, gyroscope data, global positioning system data, or any combination thereof. Using at least the position and orientation of UAV 101, flight control system 115 can select a group of the directional antennas 105 to use for wireless communications.

In some embodiments, flight control system 115 further evaluates which directional antenna(s) of directional antennas 105 to communicate with based on which directional antenna has a line of sight to controller 130. Flight control system 115 calculates the line of sight to controller 130 by comparing the determined position and orientation of UAV 101 with the position of controller 130. Controller 130 can be stationary; its position and orientation can be known by UAV 101. In other instances, UAV 101 receives controller 130's position in a communication sent from controller 130 via the wireless communication link. After determining a line of sight between UAV 101 and controller 130, flight control system can be further configured to determine a line of sight of each directional antenna of directional antennas 105 to determine which line of sight of the directional antennas 105 aligns with the line of sight to controller 130. Each directional antenna of directional antennas 105 has a fixed directivity, so flight control system 115 can calculate each line of sight based on the orientation of UAV 101.

Flight control system 115 can first select which group of directional antennas to communicate with. After flight control system 115 determines which group to utilize, flight control system 115 can further select a set of antennas within the group from which to transmit. The selected set can comprise a single directional antenna or it may be two or all three directional antennas of the group. To select and switch between directional antennas, flight control system 115 can comprise or be coupled with a switching mechanism, which can mechanically, electromechanically, digitally, or the like, select the set of antennas. Then, flight control system 115 directs transmitter 120 to communicate signals to controller 130 using the set of directional antennas. Transmitter 120 distributes power to the selected set of directional antennas such that a cumulative gain achieved by the selected set does not exceed a threshold. Thus, flight control system 115 can ensure that the gain produced by the one or more directional antennas selected does not violate regulatory communication restrictions.

Furthermore, as UAV 101 continues to maneuver around a scene, change directions, and/or change orientations about the reference axes, flight control system 115 can continually select and reselect which directional antenna of directional antennas 105 to transmit from based at least on the factors discussed above. This repetition ensures that an optimal gain and maximum range of operation is achieved in the direction of controller 130.

Figure 2:
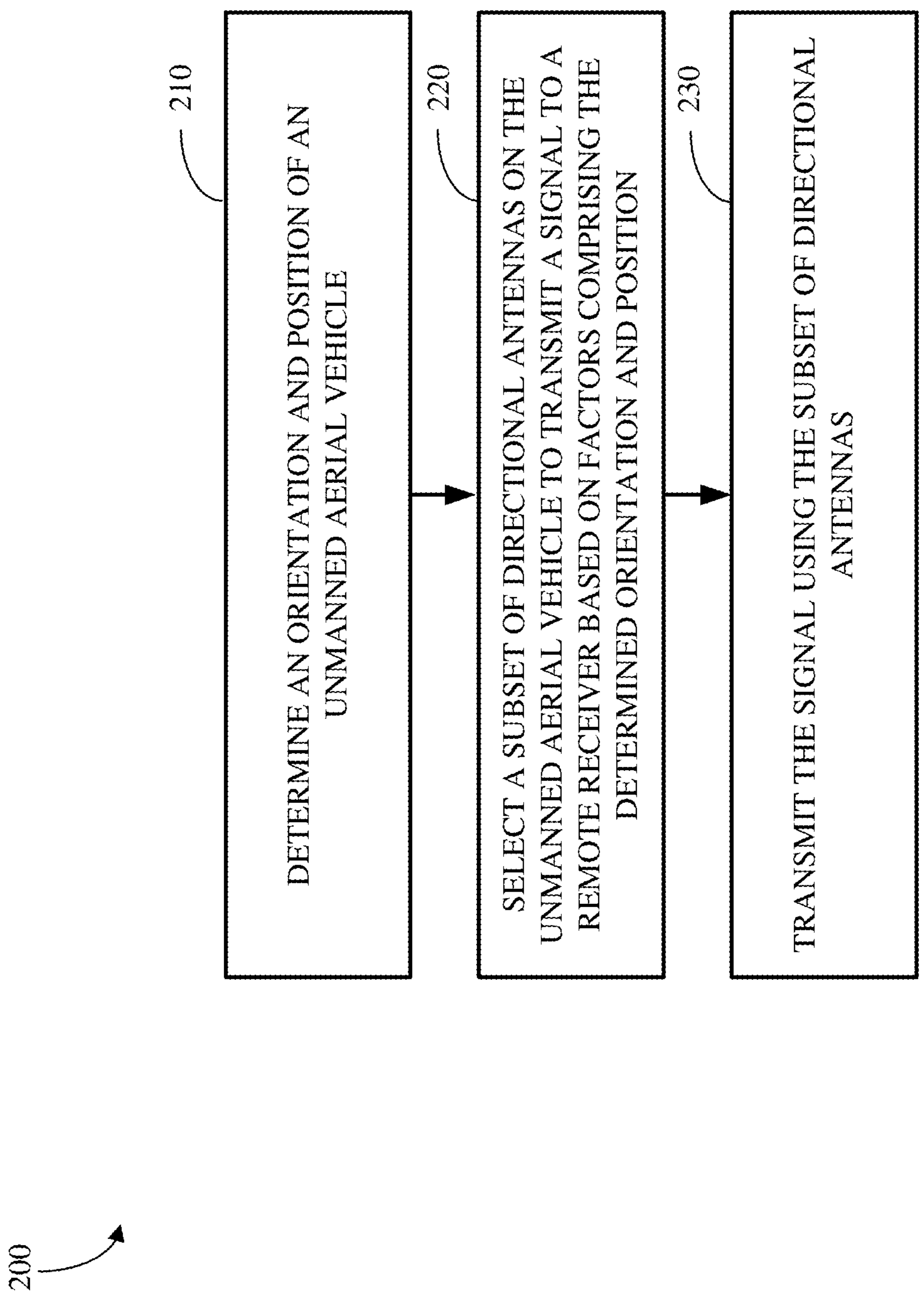
FIG. 2 is a flowchart illustrating an exemplary process for dynamic antenna switching in accordance with some embodiments of the present technology.

FIG. 2 is a flowchart illustrating an exemplary process for dynamic antenna switching using an unmanned aerial vehicle. FIG. 2 includes process 200 which further includes various steps to achieve proper communication with a remote receiver based a UAV's position and orientation about a space. For example, process 200 can be implemented in UAV 101 of FIG. 1, UAV 301 and 301' of FIG. 3, processor 430 of FIG. 4, and UAV 501 of FIGS. 5A and 5C.

Process 200 includes determining 210 an orientation and position of an unmanned aerial vehicle. In some embodiments, the orientation and position of the UAV can be determined about a true north direction and a horizon. Further, the orientation and position can be determined with respect to a remote receiver to find a line of sight between the UAV and the receiver. The remote receiver can be a controller, such as a hand-held device, computer, tablet, mobile phone, or a ground station or dock at a remote location from the UAV. In other embodiments, control of the UAV can be performed autonomously wherein the UAV is programmed to fly according to a flight plan stored in a computer-readable storage media and accessible by a computing device. The UAV and the remote receiver communicate via a wireless link, such as a Bluetooth Link, a WiFi link, or the like, to persist each other's locations among other data. Therefore, the UAV has knowledge of the remote receiver's location and direction for calculating line of sight. The UAV can obtain GPS data, accelerometer data, gyroscopic data, or a combination thereof, to determine its position and orientation.

Process 200 also includes selecting 220 a subset of directional antennas on the UAV to transmit a signal to the remote receiver based on factors such as the orientation and position of the UAV. In various embodiments, further factors comprise the line of sight between the UAV and remote receiver, a line of sight between each antenna of the directional antennas, a gain of each antenna of the directional antennas, or some combination thereof. In an embodiment, the UAV comprises a dual active antenna chain, wherein each antenna chain includes at least three directional antenna elements. An example subset of the directional antenna elements is one or more of the at least three directional antenna elements of one antenna chain. Following this example, the UAV can determine that one of its six antenna elements has a line of sight to the receiver based on the receiver's location. If two different antenna elements have similar lines of sight to the receiver, the UAV can determine which element aligns more closely, and subsequently, which antenna element produces the best gain in that direction. While in a receive mode, wherein the UAV is receiving transmissions, the UAV can operate using both antenna chains to receive the information.

Next, process 200 includes transmitting 230 the signal using the subset of directional antennas. The UAV can transmit signals or data (e.g., image or video data captured by a camera or sensor) via the subset of directional antennas over a bandwidth. Transmission of the signals can be performed by a transmitter located on the UAV, such as transmitter 120 of FIG. 1. In some domains, antenna transmissions from a UAV or UAS can be limited by a maximum EIRP or gain. By first selecting a subset of directional antennas (e.g., in selecting step 220) to transmit from, the UAV can route power to only the selected antennas to maximize their gain and EIRP, while also not exceeding the regulatory threshold set in the domain. It may be appreciated that some instances of antenna selection do not produce increases in gain but allow for efficient transmission and/or power conversation, among other things.

In some embodiments, process 200 can include selecting another subset of directional antennas to transmit the signal based at least on a change in orientation of the UAV. The remote receiver comprises inputs to change the UAV's direction, position, orientation, or some combination thereof. For example, the inputs can include one or more joysticks, a touchpad or touchscreen with directional inputs, and/or an apparatus comprising an accelerometer that controls direction based off its movements, or the like. Where the remote receiver is a handheld device, a joystick can control 360-degree movements of the UAV along with vertical and horizontal movements of the UAV. The movements commanded by the device can be communicated wirelessly to the UAV. Upon a change in direction, position, orientation, or a combination thereof, the UAV can determine whether the change affected the directional antennas' lines of sight to the remote receiver. If so, the UAV can select another subset of directional antennas that has a current line of sight, and it can transmit using the newly selected subset. This step can repeat during the lifecycle of the UAV's mission to dynamically select appropriate directional antenna(s) to transmit from.

Figure 3:
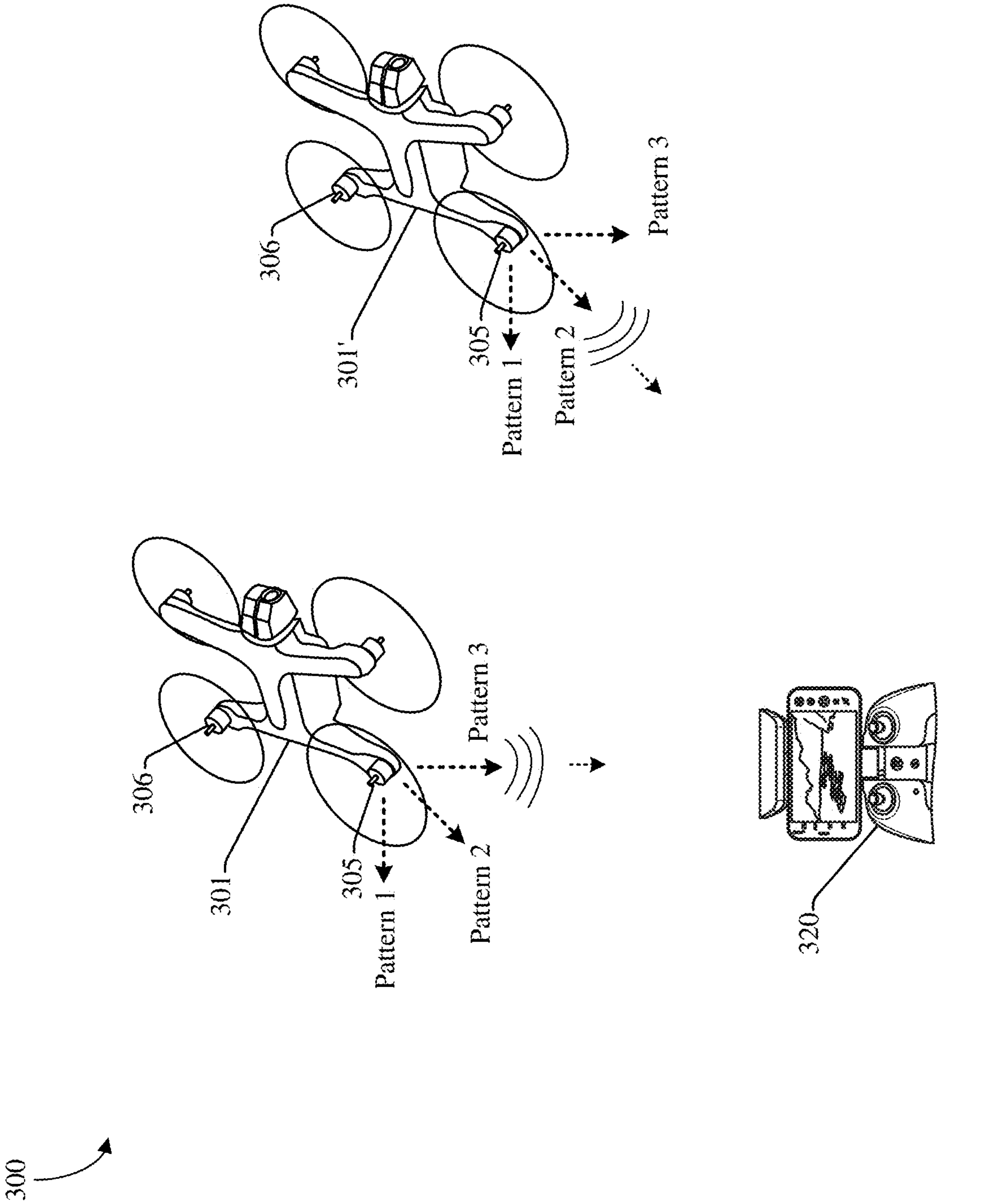
FIG. 3 illustrates an exemplary operating environment using dynamic antenna switching on an unmanned aerial vehicle in accordance with some embodiments of the present technology.

Moving to FIG. 3, FIG. 3 illustrates an exemplary operating environment using dynamic antenna switching on an unmanned aerial vehicle. FIG. 3 includes operating environment 300, which further includes UAV 301, UAV 301', and controller 320. UAV 301 and 301' exemplify the UAV operating at different points in time. UAV 301 and 301' both include antenna chain 305 and antenna chain 306, each containing three directional antennas.

In operation, UAV 301 moves horizontally through the air. UAV 301 can determine its position and orientation with respect to controller 320 to determine which antenna chain (i.e., antenna chain 305 or antenna chain 306) to choose to transmit information from. Each directional antenna (i.e., pattern 1, pattern 2, and pattern 3 (not pictured for antenna chain 306)) has a fixed directivity it can transmit towards. UAV 301 can determine, based on its orientation and position, and based on a projected direction that each directional antenna can transmit, which of the directional antennas has a line of sight to controller 320. In the instance illustrated in FIG. 3, UAV 301 is oriented in a way that directional antenna pattern 3 of antenna chain 305 aligns with controller 320. Accordingly, UAV 301 can select to transmit a signal to controller 320 using pattern 3 of antenna chain 305. It may be noted that each directional antenna may be internal to UAV 301, external to UAV 301, or some combination thereof.

Next, FIG. 3 illustrates UAV 301' where the same UAV has changed position and orientation with respect to controller 320. In this instance, UAV 301' can be operating after controller 320 has commanded the UAV to move. As a result, UAV 301' performs another determination of orientation, position, and line of sight to select another antenna. UAV 301' determines that antenna chain 305 still has the optimal view of controller 320, and that pattern 1 of antenna chain 305 has a line of sight aligned with controller 320. UAV 301' can determine that pattern 1 transmits a maximum gain in that direction, so UAV 301' selects it for transmitting to controller 320. In other representations, various orientations, positions, or combinations thereof allow for determinations by which different antenna chains and/or directional antennas are selected for wireless transmission. Because UAV 301 and 301' can employ only one directional antenna while in transmit mode, such as antenna chain 305, the EIRP and gain produced by the antenna chain can be maximized. Using more than one antenna/antenna chain can produce a cumulative EIRP that is lower (greater?) than the EIRP radiated from the single antenna chain, which reduces an amount of allowable power and can violate regulatory communication standards. Advantageously, UAV 301 and 301' can employ a single directional antenna, such as antenna chain 305, rather than using multiple antennas or antenna chains for signal transmission. This will reduce power consumption and allow for improved operating range and operating time while maintaining compliance with any regulatory limitations on antenna power. While UAV performs in receive mode, however, UAV 101 employs both antenna chain 305 and antenna chain 306 as signal reception is not as stringently regulated as signal transmission.

Figure 4:
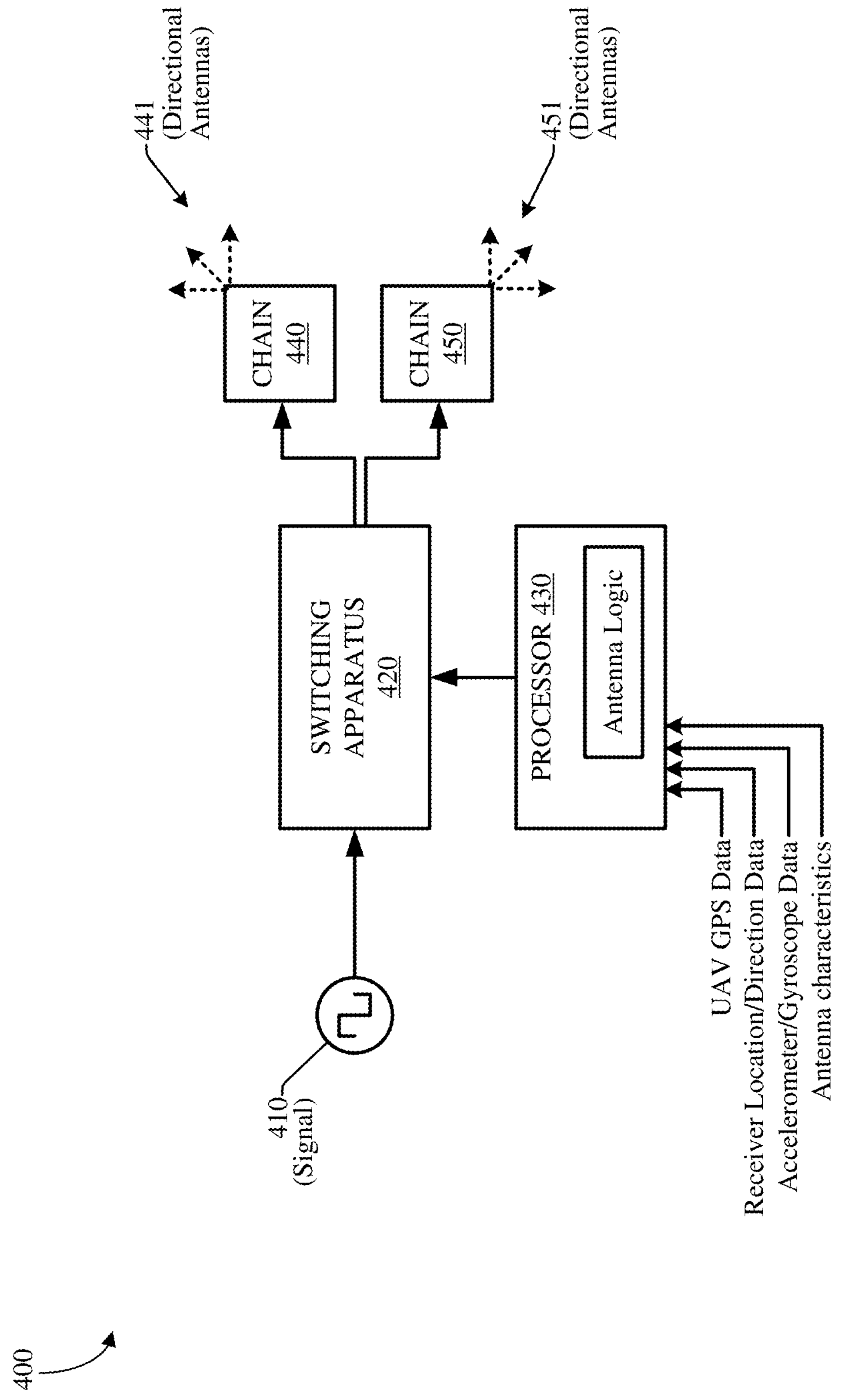
FIG. 4 illustrates an exemplary operating architecture in which some embodiments of the present technology may be utilized.

FIG. 4 illustrates an exemplary operating architecture 400 in accordance with some embodiments of the present technology. Operating architecture 400 includes signal 410, switching apparatus 420, processor 430, antenna chain 440, and antenna chain 450. Both antenna chain 440 and antenna chain 450 further include directional antennas 441 and 451, respectively, that represent three multiple directional antenna patterns. For example, operating architecture 400 can be implemented on UAV 101 of FIG. 1, UAV 301 and 301' of FIG. 3, and UAV 501 of FIGS. 5A and 5C. Operating architecture may implement process 200 of FIG. 2.

A signal 410 (i.e., radio frequency signal) generated by a UAV is input into switching apparatus 420. Signal 410 comprises information captured or generated by the UAV, such as image or video data, GPS data, sensor data, or the like. Also, switching apparatus 420 receives an input from processor 430 with a selection of a directional antenna of directional antennas 441 and 451 to transmit signal 410 from. Processor 430 receives various inputs including but not limited to the following: UAV's GPS data indicating at least a position of the UAV; a remote receiver's location and direction data; accelerometer and/or gyroscope data indicating at least an orientation of the UAV; and antenna characteristics, such as strength, efficiency, directivity, and the like, of each directional antenna of directional antennas 441 and 451. Processor 430 determines an orientation and position of the UAV based on the inputs and selects a directional antenna that has a line of sight to a remote receiver. The antenna selection can be performed by an application (e.g., antenna logic) on processor 430, which can be implemented on and performed by software, firmware, hardware, or a combination thereof.

Following antenna selection, processor 430 directs switching apparatus 420 to route a signal transmission to the selected antenna chain and corresponding antenna. Switching apparatus 420 can mechanically, digitally, electromechanically, or a combination thereof, switch to antenna chain 440 or antenna chain 450 and route signal 410 through the selected directional antennas. In an example, processor 430 determines that the remote receiver has a line of sight to a directional antenna 451 of antenna chain 450. Switching apparatus 420 then electromechanically switches to antenna chain 450 and routes power through an antenna of directional antenna elements 451 to transmit signal 410 to the remote receiver. As the UAV maneuvers about, processor 430 can determine that the best fit line of sight has changed, and consequently, that an antenna of directional antennas 441 now has a line of sight to the remote receiver. Accordingly, processor 430 sends a command to switching apparatus 420 to switch from antenna chain 450 to antenna chain 440 for transmission. The antenna selection process can repeat during the lifecycle of the UAV's mission.

Figure 5A:
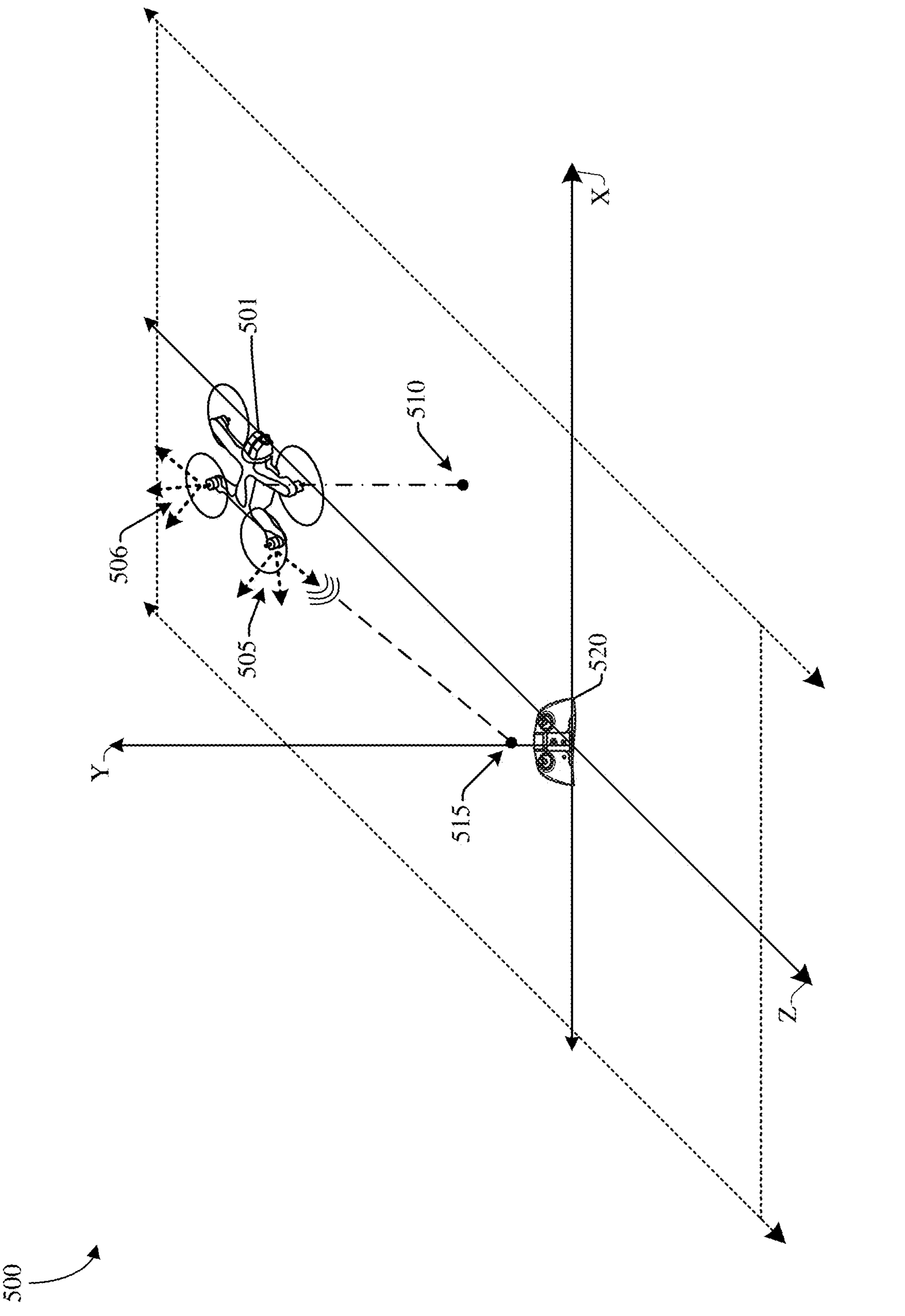
FIGS. 5A, 5B, and 5C illustrate operational examples using dynamic antenna switching in a three-dimensional environment in accordance with some embodiments of the present technology.
Figure 5B:
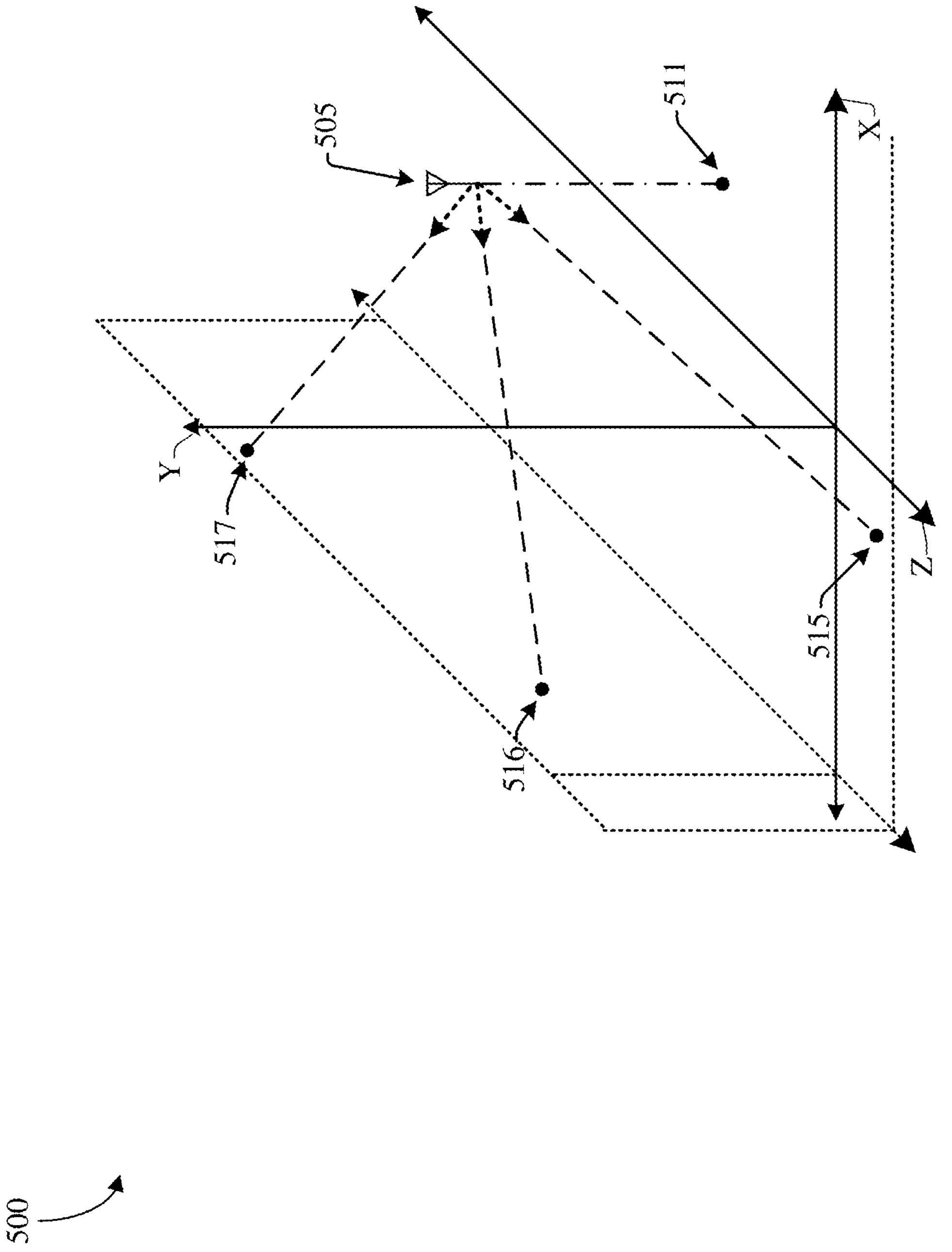
Figure 5C:
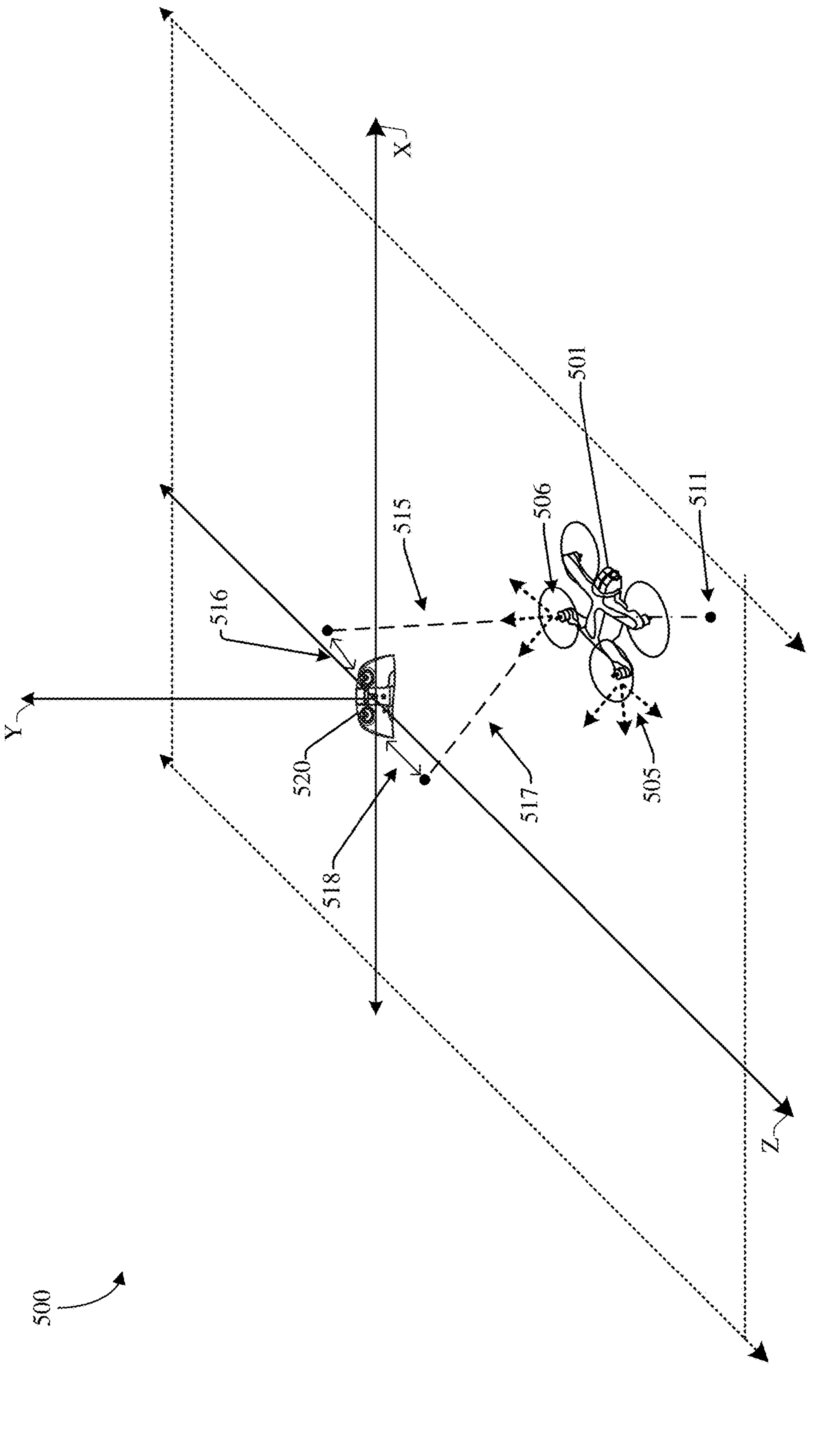

FIGS. 5A, 5B, and 5C illustrate operational examples using dynamic antenna switching with an unmanned aerial vehicle in a three-dimensional reference environment. First, FIG. 5A includes exemplary environment 500, which further includes UAV 501, antenna chain 505, antenna chain 506, UAV reference point 510, antenna transmission location 515, and controller 520. Each of antenna chain 505 and antenna chain 506 include three directional antennas internal to UAV 501 that can be selected and used to transmit and receive signals to and from UAV 501 and controller 520, respectively.

In environment 500, UAV 501 is airborne and can be referenced in a cartesian coordinate system by UAV reference point 510. Controller 520 remains at a fixed point with respect to UAV 501 (i.e., at (0,0,0)) and can command UAV 501 to fly about the three-dimensional scene. UAV 501 may have an assumed knowledge of a position and direction of controller 520 and can use that information to determine a line of sight between the two devices. In other embodiments, controller 520 can transmit its GPS data to UAV 501 to supply this information. In either instance, UAV 501 can use its own GPS data, accelerometer data, gyroscope data, or a combination thereof to determine its own orientation and position with respect to controller 520. It may be further appreciated that UAV 501 can be commanded manually, function fully autonomously, or some combination thereof.

UAV 501 can determine which antenna of antenna chain 505 and antenna chain 506 corresponds with the line of sight to controller 520 based at least on UAV 501's orientation and position. For example, UAV 501 determines that an antenna of antenna chain 505 faces controller 520. Specifically, UAV 501 determines that the antenna directed towards the z-axis has an approximate antenna transmission location 515 in the direction of controller 520. Antenna transmission location 515 can be determined by one or more antenna characteristics stored on computer-readable storage media on UAV 501. Accordingly, UAV 501 selects antenna chain 505 to transmit a signal to controller 520. The transmission can reach controller 520 over a wireless communication link, such as Bluetooth or Wi-Fi.

FIG. 5B includes a zoomed-in illustration of the directional antennas of antenna chain 505 with respect to the reference cartesian coordinate system of exemplary environment 500. Exemplary environment 500 further includes antenna chain 505, antenna transmission locations 515, 516, and 517, and antenna chain reference location 511.

As illustrated in FIG. 5B, antenna chain 505 has three directional antennas each pointing different directions based at least on an orientation and position of a UAV (not pictured). Each of antenna transmission locations 515, 516, and 517 represent an approximate beam that can be transmitted from its respective directional antenna of antenna chain 505. It may be appreciated that in some embodiments, the directional antennas can be angled or oriented differently. Depending at least on a position and orientation of the UAV and a line of sight from the UAV to a control device (not pictured), the UAV can select one of the directional antennas to communicate data from over a frequency range. UAV selects the directional antenna with an antenna transmission location closest to the controller or at least in a field of view of the controller.

FIG. 5C illustrates a variation of exemplary environment 500 wherein UAV 501 has changed position and orientation with respect to controller 520. In FIG. 5C, exemplary environment 500 includes UAV 501, antenna chain 505, antenna chain 506, UAV reference point 511, and controller 520. In this variation, UAV 501 can be partially referenced in the cartesian coordinate system by UAV reference point 511, which is in a different quadrant compared to UAV 501's location in FIG. 5A.

As UAV 501 changes positions and/or orientations, it can iteratively determine if a different antenna chain of antenna chains 505 and 506 has a current line of sight to controller 520. If UAV 501 determines that a change in orientation and/or position has not changed its line of sight to controller 520, then UAV 501 can continue to transmit signals to controller 520 via an initially selected antenna. Once the orientation and/or position of UAV 501 changes beyond a threshold, UAV 501 can determine an updated orientation and position with respect to controller 520 and select a different antenna chain and/or directional antenna. The threshold can be defined as a range of degrees about one or more axes, a range of height change, or the like, or a combination thereof.

In FIG. 5C, UAV 501 has changed position and orientation and determines that at least one directional antenna apart of antenna chain 506 has a line of sight to controller 520. In this instance, two of the antennas transmit in the direction of controller 520, as shown by antenna transmission locations 515 and 517. Although both transmissions have line of sight to controller 520, transmission distance 516 is closer to controller 520 than transmission distance 518 is, so UAV 501 selects the antenna of antenna chain 506. In other representations, UAV 501 can calculate a gain producible by each antenna in addition to or as opposed to using a distance calculation to determine which antenna element to use.

Disclosed herein are implementations of antenna selection using an unmanned aerial vehicle.

In a first aspect, the subject matter described in this specification can be embodied in systems that include an unmanned aerial vehicle comprising: a flight control system configured to communicate with a remote receiver via directional antennas on the unmanned aerial vehicle, a propulsion system operatively coupled with the flight control system and configured to propel the unmanned aerial vehicle as directed by the flight control system, wherein the flight control system is configured to at least: determine an orientation and position of the unmanned aerial vehicle; select a subset of the directional antennas to transmit a signal to the remote receiver based on factors comprising the determined orientation and position; and direct a transmitter to transmit the signal using the subset of the directional antennas.

In a second aspect, the subject matter described in this specification can be embodied in systems that include the unmanned aerial vehicle of the preceding aspect, wherein to select the subset of the directional antennas based on the factors, the flight control system is configured to determine which one of the directional antennas has a direction that comprises a best fit with a line of sight to the remote receiver.

In a third aspect, the subject matter described in this specification can be embodied in systems that include the unmanned aerial vehicle of the preceding aspects, or any combination thereof, wherein the flight control system is further configured to calculate the line of sight to the remote receiver based at least on the position of the unmanned aerial vehicle and a position of the remote receiver.

In a fourth aspect, the subject matter described in this specification can be embodied in systems that include the unmanned aerial vehicle of the preceding aspects, or any combination thereof, wherein the flight control system is further configured to determine, for each of the directional antennas, the direction of a given antenna based at least on the orientation of the unmanned aerial vehicle.

In a fifth aspect, the subject matter described in this specification can be embodied in systems that include the unmanned aerial vehicle of the preceding aspects, or any combination thereof, wherein, to direct the transmitter to transmit the signal, the flight control system directs the transmitter to distribute power to the subset of the directional antennas such that a cumulative gain of the subset of the directional antennas does not exceed a threshold.

In a sixth aspect, the subject matter described in this specification can be embodied in systems that include the unmanned aerial vehicle of the preceding aspects, or any combination thereof, wherein the directional antennas consist of two groups of antennas that each contain a separate half of the directional antennas, and wherein the separate half of the directional antennas consists of at least three directional antennas.

In a seventh aspect, the subject matter described in this specification can be embodied in systems that include the unmanned aerial vehicle of the preceding aspects, or any combination thereof, wherein the subset of the directional antennas comprises one or more antennas of only one of the two groups of antennas.

In an eighth aspect, the subject matter described in this specification can be embodied in methods that include determining an orientation and position of the unmanned aerial vehicle, selecting a subset of directional antennas on the unmanned aerial vehicle to transmit a signal to a remote receiver based on factors comprising the determined orientation and position of the unmanned aerial vehicle, and transmitting the signal using the subset of directional antennas.

In a ninth aspect, the subject matter described in this specification can be embodied in methods of the preceding aspect, wherein selecting the subset of the directional antennas based on the factors further comprises determining which one of the directional antennas has a direction that comprises a best fit with a line of sight to the remote receiver.

In a tenth aspect, the subject matter described in this specification can be embodied in methods of the preceding aspects, or any combination thereof, further comprising calculating the line of sight to the remote receiver based at least on the position of the unmanned aerial vehicle and a position of the remote receiver.

In an eleventh aspect, the subject matter described in this specification can be embodied in methods of the preceding aspects, or any combination thereof, further comprising determining, for each of the directional antennas, the direction of a given antenna based at least on the orientation of the unmanned aerial vehicle.

In a twelfth aspect, the subject matter described in this specification can be embodied in methods of the preceding aspects, or any combination thereof, wherein transmitting the signal using the subset of directional antennas further comprises distributing power to the subset of the directional antennas such that a cumulative gain of the subset of the directional antennas does not exceed a threshold.

In a thirteenth aspect, the subject matter described in this specification can be embodied in methods of the preceding aspects, or any combination thereof, wherein the directional antennas consist of two groups of antennas that each contain a separate half of the directional antennas, and wherein the separate half of the directional antennas consists of at least three directional antennas.

In a fourteenth aspect, the subject matter described in this specification can be embodied in methods of the preceding aspects, or any combination thereof, wherein the subset of the directional antennas comprises one or more antennas of only one of the two groups of antennas.

In a fifteenth aspect, the subject matter described in this specification can be embodied in a computing apparatus that comprises one or more computer-readable storage media, and program instructions stored on the one or more computer-readable storage media that, based on being read and executed by the processing system, direct an unmanned aerial vehicle to at least: determine an orientation and position of an unmanned aerial vehicle; select a subset of directional antennas on the unmanned aerial vehicle to transmit a signal to a remote receiver based on factors comprising the determined orientation and position; and transmit the signal using the subset of the directional antennas.

In a sixteenth aspect, the subject matter described in this specification can be embodied the computing apparatus of the preceding aspect, wherein to select the subset of the directional antennas based on the factors, the program instructions further direct the unmanned aerial vehicle to determine which one of the directional antennas has a direction that comprises a best fit with a line of sight to the remote receiver.

In a seventeenth aspect, the subject matter described in this specification can be embodied in the computing apparatus of the preceding aspects, or any combination thereof, wherein the program instructions further direct the unmanned aerial vehicle to calculate the line of sight to the remote receiver based at least on the position of the unmanned aerial vehicle and a position of the remote receiver.

In an eighteenth aspect, the subject matter described in this specification can be embodied in the computing apparatus of the preceding aspects, or any combination thereof, wherein the program instructions further direct the unmanned aerial vehicle to determine, for each of the directional antennas, the direction of a given antenna based at least on the orientation of the unmanned aerial vehicle.

In a nineteenth aspect, the subject matter described in this specification can be embodied in the computing apparatus of the preceding aspects, or any combination thereof, wherein to transmit the signal, the program instructions further direct the unmanned aerial vehicle to distribute power to the subset of the directional antennas such that a cumulative gain of the subset of the directional antennas does not exceed a threshold.

In a twentieth aspect, the subject matter described in this specification can be embodied in the computing apparatus of the preceding aspects, or any combination thereof, wherein the directional antennas consist of two groups of antennas that each contain a separate half of the directional antennas, wherein the separate half of the directional antennas consists of at least three directional antennas, and wherein the subset of the directional antennas comprises one or more antennas of only one of the two groups of antennas.

Discussed below is an operational scenario in accordance with some embodiments of the present disclosure.

Multiple directional drone antennas allow for unmanned aircraft systems (UAS) to direct an antenna gain toward the location of a drone controller, thus achieving superior link performance and limiting level of interference. At the same time, some wireless radios include several chains to overcome spatial limitations associated with channel fading and signal combining. The combination of both mechanisms supports an enhanced communication link that is critical to enable long range communication with a UAS. As an example, a dual chain radio would employ a standard single antenna element for the purpose of creating an omni-directional coverage can be compared against a solution where multiple directional antenna elements would be attached to each of these two chains, each can be selected.

With a set of side information associated with the location of the UAS control device, the UAS can point its radiated energy from each of the chains by selecting a specific antenna element per chain. This can allow for the best possible gain to be achieved towards the desired direction. Some UAS and ground stations include sets of GPS and accelerometer information from which one can extract the needed side information to establish the absolution position and orientation of the drone and the controller.

In this operational scenario, an antenna selection mechanism is presented that optimizes the gain in the preferred direction and at the same time allows for optimal average gain in the range of interest under the constraints of certain regulatory domains which limits the radiated power spectral density. Specifically, some regulatory domains limit the maximum EIRP from a communication device or the power spectral density it is allowed to radiate per a given bandwidth.

For the scenario mentioned above, an EIRP limitation can include the sum of the transmit power and the maximum antenna gain (in any direction, irrespective to preferred field of view). For the two chain example, since both chains operate separately, the maximum allowed power is decreased by half. For instance, exemplary calculations associated with Japan regulatory requirements are provided: EIRP limitation=10 dBm/MHz (Japan/EU); Number of chains=2; Maximum antenna gain (3 dBi); Mandated maximum EIRP per chain=10*log 10(2)=4 dBm/MHz.

For each chain, the drone can select a specific antenna out of a set of directional antennas to maximize the gain in the direction of the controller. Choosing the maximum gain may, however, not be the most optimal in terms of the preferred field of view. Specifically, a cumulative EIRP associated with radiation from both antennas and chains in a certain direction can be lower than an EIRP radiated from a single antenna. Thus, the benefit of such an approach can be up to twice the power.

Furthermore, if the said antenna maximum gain is achieved in one of the sectors which is not associated with the preferred field of view a modification of the antenna selection algorithm is proposed to mitigate and improve the average EIRP. Namely, the modification can increase the output power per antenna selection such that for every antenna that is selected, the drone can achieve the maximum power in a direction.

Figure 6A:
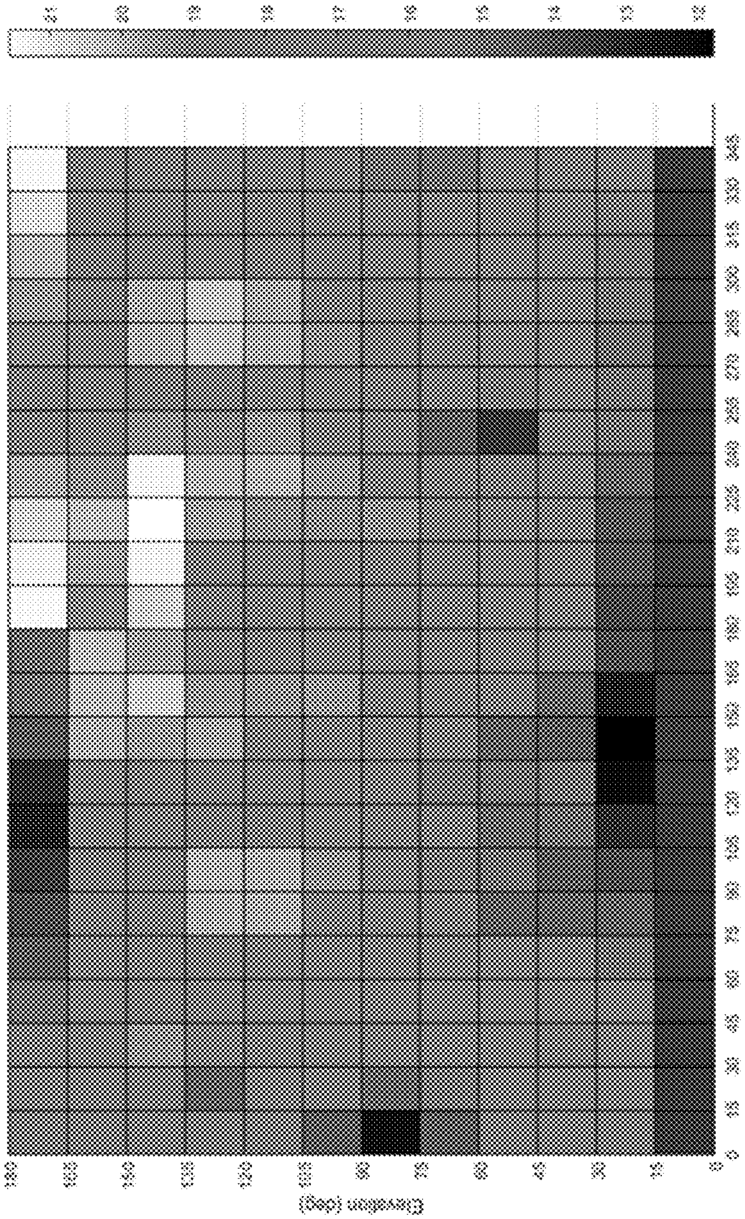
FIGS. 6A and 6B illustrate graphical EIRP outputs using dynamic antenna switching in accordance with some embodiments of the present technology.

While regulatory domains tend to mandate the allowed radiated power, they normally do not limit gain in the receive side. For the receive side, a different selection mechanism can be applied such that it allows both chains to always operate and select the maximum gain in the direction of the control device. FIG. 6A illustrates the combined EIRP distributed in azimuth and elevation.

Still referring to the proposed example in conjunction with FIG. 6A, the preferred field of view for long range communication is between 90 and 105 degrees of elevation. 90 degrees references the true horizon and 105 represents a slightly lower-than-horizon direction towards the ground. Because the drone rotates, all 360 degrees in Azimuth should be considered in the scenario. As demonstrated by the above figure, the EIRP is aggregated from two separate antennas, wherein each has a maximum of 19.5 dBmi, an average of 18 dBmi, and a minimum of 14 dBmi. Additionally, a front/back EIRP is 14 dBmi/17 dBmi.

As discussed above, selecting a single antenna per direction can be applied. Thus, the output power can be increased for the selected chain by a factor of two since the scenario does not use both antennas and chains. As a result, the selected antenna in this approach provides a maximum 21.7 dBmi, an average of 19.5 dBmi, and a minimum of 14.2 dBmi in the preferred field of view. Additionally, a front/back EIRP is 14.5 dBmi/18 dBmi.

Figure 6B:
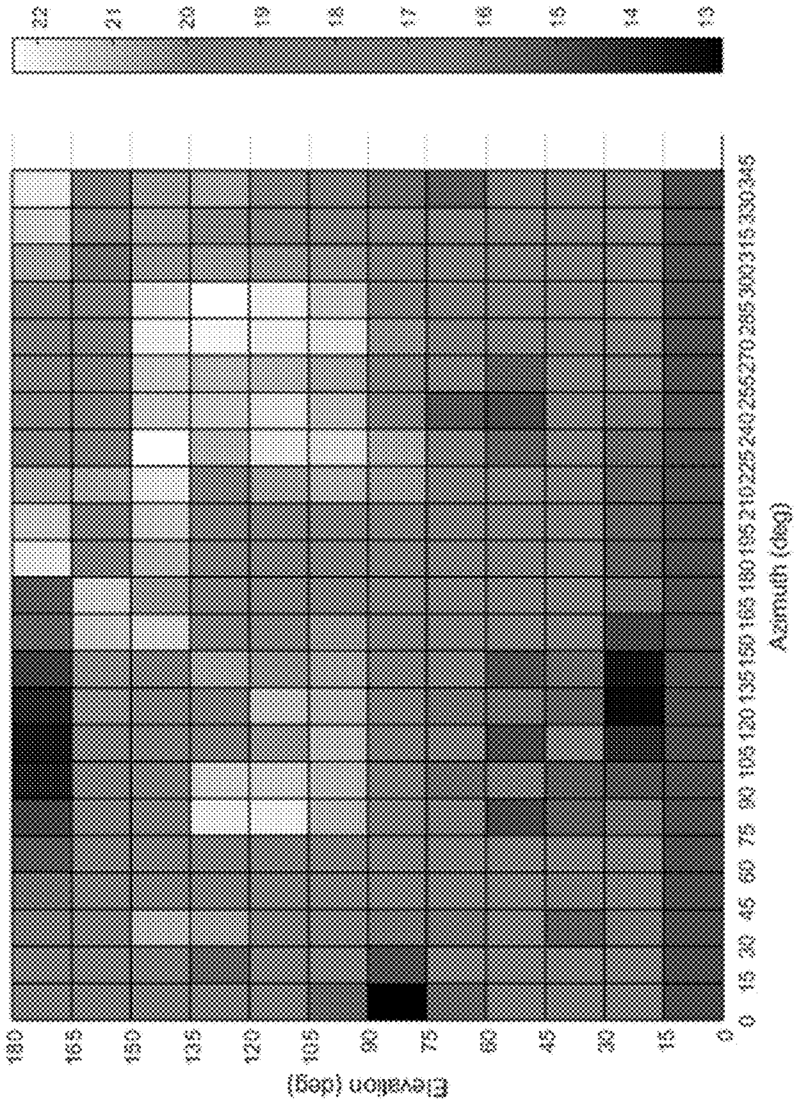

Further, and as seen in results shown in FIG. 6B, a maximization mechanism can also be applied to the single antenna approach in order to optimize the maximum gain associated with each antenna. The maximum gain that is applied in the regulatory domain can include gain that represents the maximum gain across all directions as well as across all antennas. Using the maximization mechanism, the output power of the transmitter can be changed to compensate for the relative delta between the antenna such that when a specific antenna/chain is selected, the EIRP can be maximized irrespective of the antenna selected. As an example, when an antenna is selected with a maximum gain in all angles of 1.9 dBi and the maximum allowed EIRP is 23 dBm, the output power for this specific antenna can be adjusted to transmit 21.1 dBm. For a different antenna with a maximum power of 1 dBi, the output power can be adjusted to 22 dBm. This approach provides a maximum 23 dBmi, an average of 20.7 dBmi, and a minimum of 17.2 dBmi in the preferred field of view. The front/back EIRP is 17 dBmi/19 dBmi. This approach allowed an increased coverage/range from 18 dBmi to 20.5 dbmi, while the minimum was improved from 14 dBm to 17.2 dBmi.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Unless the context clearly requires otherwise, throughout the description and the claims, the words "comprise," "comprising," "such as," and "the like" are to be construed in an inclusive sense, as opposed to an exclusive or exhaustive sense, that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having operations, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

What is claimed is:

1. A switching apparatus comprising:

one or more processors; and a transmitter coupled to a plurality of directional antennas;

wherein the one or more processors are configured to:

receive information indicating an orientation and a position of a vehicle;

select one or more of the plurality of directional antennas for transmitting a signal based at least on the orientation and the position of the vehicle; and direct the transmitter to distribute power to the selected one or more directional antennas to transmit the signal using the selected one or more directional antennas, such that a cumulative gain of the selected one or more directional antennas does not exceed a threshold.

2. The switching apparatus of claim 1, wherein the one or more processors are further configured to calculate a line of sight to a remote receiver based at least on the orientation and position of the vehicle.

3. The switching apparatus of claim 2, wherein the one or more processors are further configured to determine which directional antenna of the one or more directional antennas has a direction that comprises a best fit with the line of sight to the remote receiver.

4. The switching apparatus of claim 3, wherein the information received by the switching apparatus further comprises the best fit with the line of sight to the remote receiver.

5. The switching apparatus of claim 1, wherein the switching apparatus is configured to switch between the plurality of directional antennas using mechanical switching, electromechanical switching, digital switching, or a combination thereof.

6. The switching apparatus of claim 5, wherein the plurality of directional antennas comprise at least two antenna chains, each antenna chain including a set of directional antennas, and wherein to select the one or more directional antennas, the one or more processors is configured to select a directional antenna from one of the at least two antenna chains at a time.

7. The switching apparatus of claim 1, wherein the threshold corresponds to an effective isotropic radiated power threshold associated with a regulatory standard.

8. The switching apparatus of claim 1, wherein the one or more processors are configured to repeatedly evaluate the orientation and the position of the vehicle and responsively re-select the one or more directional antennas.

9. A transmission subsystem, comprising:

a switching apparatus;

a transmitter coupled to the switching apparatus; and a set of directional antennas coupled to the transmitter;

wherein the switching apparatus is configured to:

receive an input indicating at least an orientation and a position of a device; and responsive to receiving the input, select one or more directional antennas of the set of directional antennas from which to communicate a signal with based at least on the orientation and the position; and direct the transmitter to distribute power to the selected one or more directional antennas to transmit the signal, such that a cumulative gain of the selected one or more directional antennas does not exceed a threshold.

10. The transmission subsystem of claim 9, wherein the switching apparatus is configured to calculate a line of sight to a remote receiver based at least on the orientation and the position.

11. The transmission subsystem of claim 10, wherein the switching apparatus is configured to determine which directional antenna of the set of directional antennas has a direction that comprises a best fit with the line of sight to the remote receiver.

12. The transmission subsystem of claim 11, wherein the input received by the switching apparatus further comprises the best fit with the line of sight to the remote receiver.

13. The transmission subsystem of claim 9, wherein to direct the transmitter to transmit the signal, the switching apparatus directs the transmitter to adjust an output power level based on a maximum gain associated with each selected directional antenna.

14. The transmission subsystem of claim 9, wherein the transmitter is configured to transmit the signal using the one or more directional antennas of the set of directional antennas based on the power distributed to the one or more directional antennas.

15. The transmission subsystem of claim 9, wherein the threshold corresponds to an effective isotropic radiated power threshold associated with a regulatory standard.

16. The transmission subsystem of claim 9, wherein the switching apparatus selects the one or more directional antennas further based on stored antenna characteristics comprising antenna gain, antenna directivity, antenna efficiency, or a combination thereof.

17. One or more non-transitory computer-readable storage media having program instructions stored thereon that, when executed by one or more processors of a switching apparatus, cause the switching apparatus to:

receive information indicating an orientation and a position of a vehicle;

select one or more directional antennas based at least on the orientation and the position of the vehicle; and direct a transmitter to distribute power to the selected one or more directional antennas such that a cumulative gain of the selected one or more directional antennas does not exceed a threshold.

18. The one or more non-transitory computer-readable storage media of claim 17, wherein the program instructions further cause the switching apparatus to:

calculate a line of sight to a remote receiver based at least on the orientation and position of the vehicle; and determine which directional antenna of the one or more directional antennas has a direction that comprises a best fit with the line of sight to the remote receiver;

wherein the information received by the switching apparatus further comprises the best fit with the line of sight to the remote receiver.

19. The one or more non-transitory computer-readable storage media of claim 17, wherein the program instructions further cause the switching apparatus to operate using a first antenna selection mode during signal transmission and a second antenna selection mode during signal reception.

20. The one or more non-transitory computer-readable storage media of claim 19, wherein the first antenna selection mode selects a single directional antenna for transmission, and wherein the second antenna selection mode enables operational of multiple antenna chains for reception.

* * * * *